Aug. 27, 1968  C. C. POPE  3,398,409
FIXTURE FOR BACK-TO-BACK MOUNTING OF WATER CLOSETS
Filed Dec. 2, 1966  4 Sheets-Sheet 1
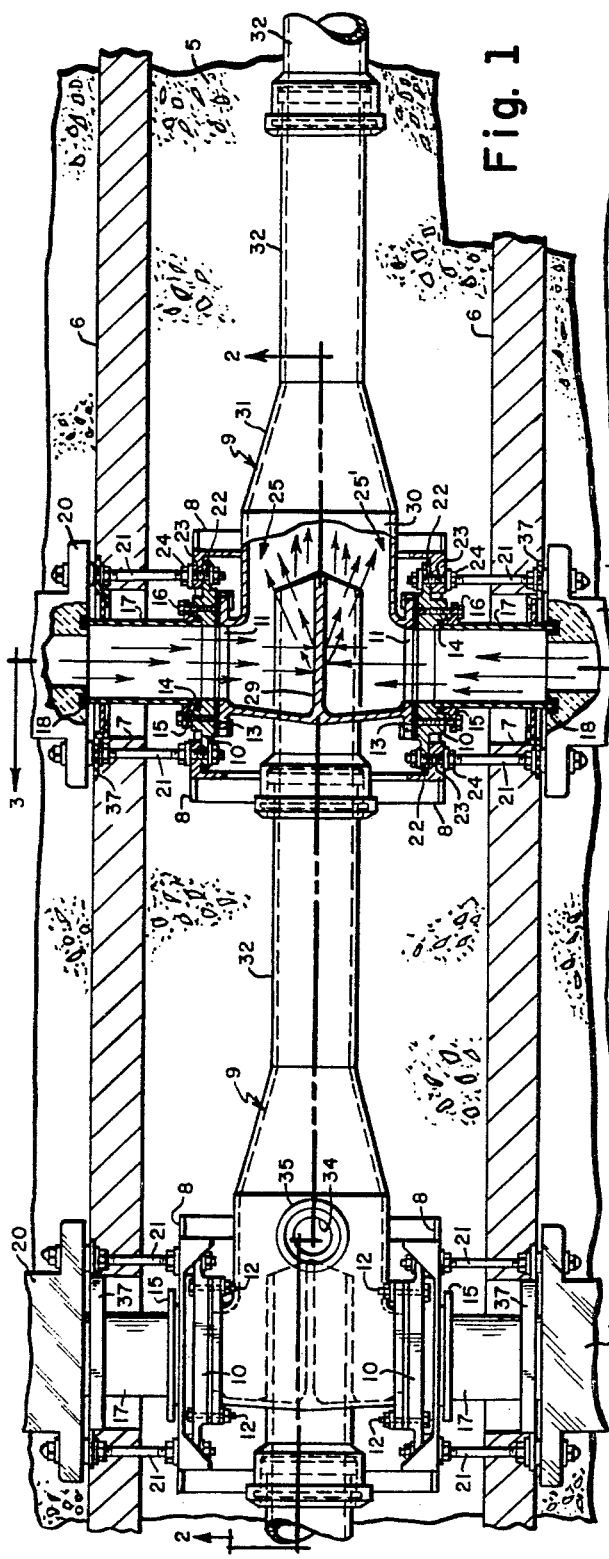
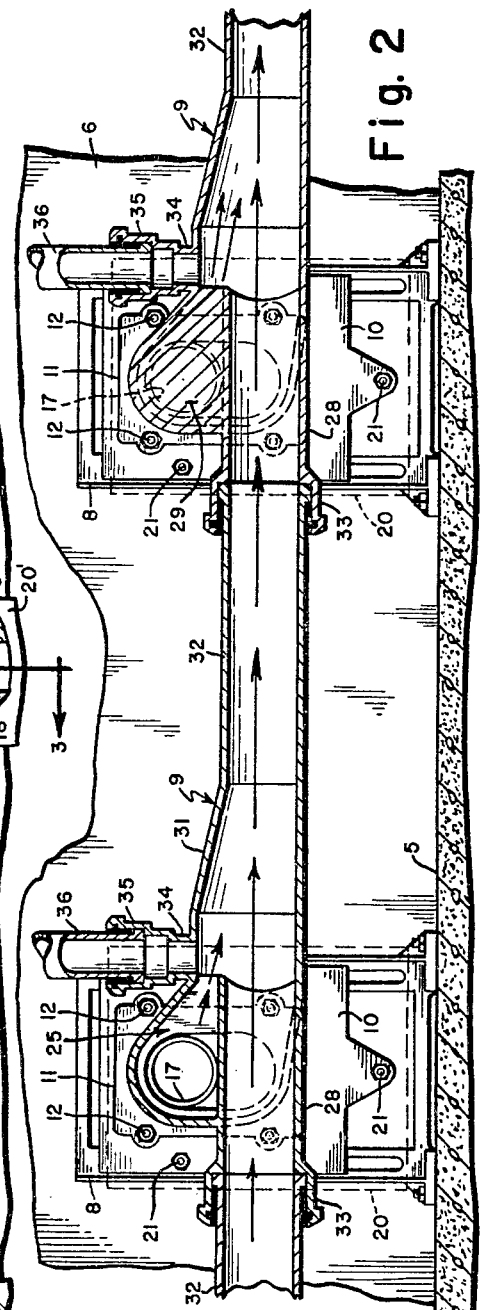
INVENTOR.
COURTNEY C. POPE
BY
*James N. Cyles*
ATTORNEY Aug. 27, 1968   C. C. POPE   3,398,409
FIXTURE FOR BACK-TO-BACK MOUNTING OF WATER CLOSETS
Filed Dec. 2, 1966   4 Sheets-Sheet 2

INVENTOR.
COURTNEY C. POPE
BY
James N. Cyles
ATTORNEY

Aug. 27, 1968  C. C. POPE  3,398,409
FIXTURE FOR BACK-TO-BACK MOUNTING OF WATER CLOSETS
Filed Dec. 2, 1966  4 Sheets-Sheet 3
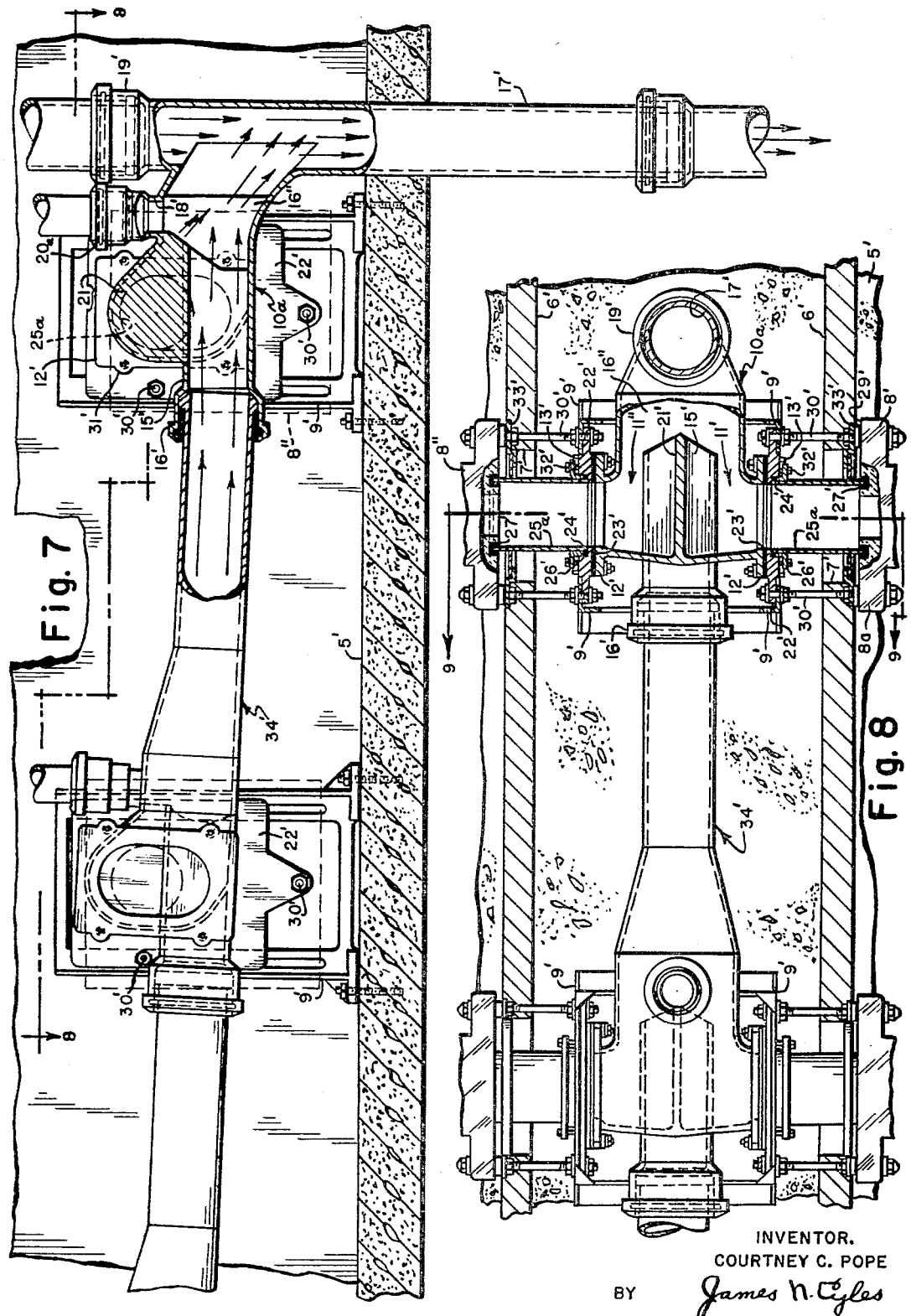
INVENTOR.
COURTNEY C. POPE
BY James N. Cyles
ATTORNEY Aug. 27, 1968  C. C. POPE  3,398,409

FIXTURE FOR BACK-TO-BACK MOUNTING OF WATER CLOSETS

Filed Dec. 2, 1966  4 Sheets-Sheet 4

INVENTOR.
COURTNEY C. POPE
BY
James N. Cyles
ATTORNEY

United States Patent Office 3,398,409
Patented Aug. 27, 1968

3,398,409
FIXTURE FOR BACK-TO-BACK MOUNTING
OF WATER CLOSETS
Courtney C. Pope, Haines City, Fla., assignor to Simpli-ci-ty Products Corporation, Haines City, Fla., a corporation of Florida
Filed Dec. 2, 1966, Ser. No. 599,668
5 Claims. (Cl. 4—252)

ABSTRACT OF THE DISCLOSURE

A fixture assembly is provided for use with back-to-back mounted water closets of either the siphon-jet type or the blow-out type. The fixture assembly includes a barrel having openings in opposite sides thereof and mounted with one of the openings opposite each of the water closets, flow sleeves communicating with the openings and also with the water closets for delivering water from the water closets to the barrel, a first soil pipe leading from upstream of the barrel into the barrel and past the sleeves and openings, a second soil pipe communicating with the barrel downstream from the openings and a baffle within the barrel dividing the interior of the barrel into two chambers. The baffle extends to a point downstream from the sleeves for directing water flow from the sleeves downstream into the second soil pipe and preventing water flow to cross the barrel and enter the other sleeve. Since the first soil pipe extends past the sleeve and openings, water flowing from upstream of the barrel is carried past the sleeves and openings to prevent entry of such water into the sleeves. The barrel, soil pipes and baffle are preferably integral portions of a single metal fixture unit. The fixture assembly is provided with seals which make it water tight, and an adjustable cover plate may be provided between sleeves and the barrel so that the barrel and soil pipes may be inclined to allow multiple installations of fixture assemblies.

---

This invention relates to a heavy duty one-piece carrier for multiple water closet installations.

The invention has for its object to provide multiple water closet installations in spaced apart relation within a wall area and where two wall mounted commodes are supported upon the outer sides of the walls.

The invention further contemplates a casting, forming a barrel that is disposed between the outlets of back-to-back commodes and with the barrel open at opposite ends or sides and covered by a plate having an aperture to receive a flow sleeve leading from each commode.

Novel features of construction and operation of the device will be more clearly apparent during the course of the following description, reference being had to the accompanying drawings wherein has been illustrated a preferred form of the device and wherein like characters of reference are employed to denote like parts throughout the several figures.

In the drawings:

FIGURE 1 is a view partly in elevation and partly in section showing the invention in an assembled relation, FIGURE 2 is a longitudinal section taken substantially on line 2—2 of FIGURE 1, FIGURE 3 is a transverse section taken substantially on line 3—3 of FIGURE 1, FIGURE 4 is a plan view of the barrel and associated parts, FIGURE 5 is a side elevational view of the device of FIGURE 4, FIGURE 6 is a transverse section taken substantially on line 6—6 of FIGURE 5, FIGURE 7 is a view partly in section and partly in elevation showing the fixture in longitudinal section and with the fixture of an adjacent device in elevation.

FIGURE 8 is a horizontal section taken substantially on line 8—8 of FIGURE 7,

Figure 3:
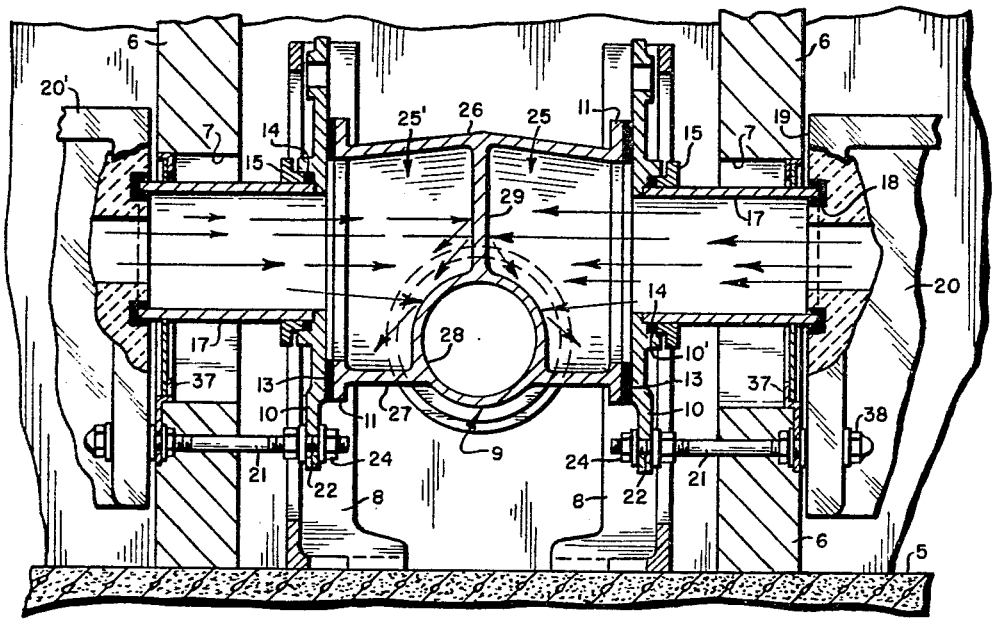
Figure 4:
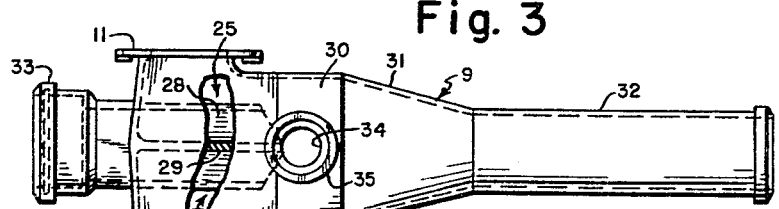
Figure 5:
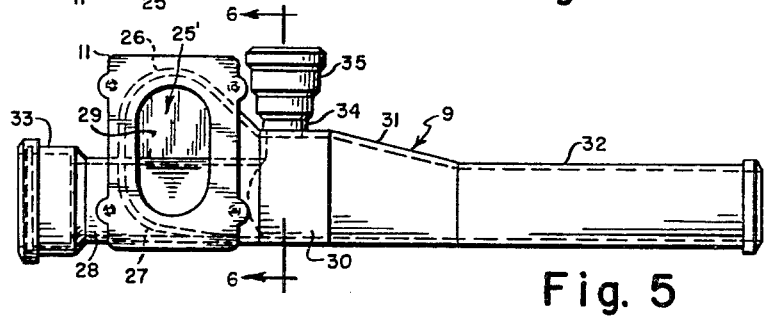
Figure 6:
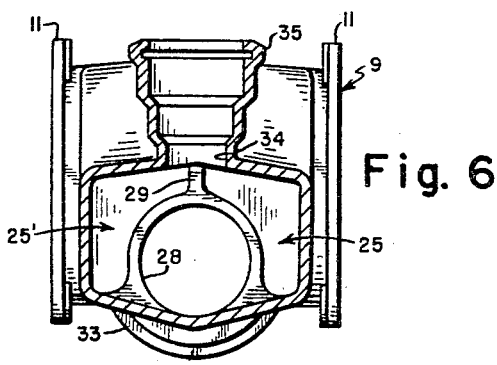

Referring specifically to the drawings, there has been provided a concrete floor 5 supporting walls 6. The walls are each provided with openings 7, for a purpose to be presently described.

Fixed to the floor 5, is a floor bracket or a pair of floor brackets 8. Fixed between the brackets 8 is a flow fixture or barrel 9, open at its opposite ends or sides and covered by the closure plate or cover plate 10 that is fixed to the flanged ends 11 of the fixture 9 and bolted thereto, as indicated at 12 and with a gasket 13 disposed between the plate 10 and the flange 11 to fully cover and seal the ends of the fixture 9. The plate 10 upon its outer sides is grooves to receive a packing ring 14, that is compressed by gland 15 by bolts 16 and with the ring 14 being compressed against or around the inner end of a sleeve 17 and with the sleeve 17 having its outer end seated against a gasket 18 within a groove of the rear wall 19 of a commode 20 and 20'. The sleeves 17 extend through the openings 7 of the walls 6. The commode is further supported against the outer face of the wall 6 by elongated bolts 21 that extend through apertures 22 of the plates 10 and also pass through vertically arranged slots 23 of the floor brackets 8, where they are locket in position by lock nuts 24.

The fixture 9, has a chamber 25 and 25', formed by an upper wall 26 and a lower wall 27 of the fixture and the lower wall 27 carries a cylindrical soil pipe section 28 and a baffle plate 29 separates the chambers 25 and 25' and the barrel is molded from a single casting. The soil pipe 28 and the baffle plate 29 terminate within an offset cylindrical extension 30 of the barrel and the extension 30 has its upper wall tapering downwardly as indicated at 31 and with the extension 31 also carrying a soil pipe 32. The soil pipe 28 also extends forwardly of the fixture and terminates in a hub 33 that receives the free end of the soil pipe 32 of the next adjacent fixture. The extension of the barrel also carries an integral upwardly extending vent pipe 34, that is provided with a hub 35, through the medium of which the vent pipe 36 may extend upwardly to similar toilet assemblies or multiple floors and with the soil pipes 28 and 32 being of identical diameters. The soil pipe 32 is of course connected to a vertically arranged soil pipe, not shown and that is connected to the several floors to thus receive the toilet flow from one commode through the soil pipes of each of the units. The bolts 21 extend through openings formed in the walls 6 and, when the commode flange 19 is forced against the wall 6, the sleeves 17 will be fully compressed into the gaskets 18 forming a seal between each commode and the barrel. The soil pipe 28 and the baffle 29 extend in the downstream direction well beyond the opposed sleeves 17 and thus prevent a flow from one toilet crossing over and entering the sleeve of the opposite commode. The flow from upstream is carried by soil pipe 28 past sleeves 17 before it merges with a flow from either sleeve, so there is no tendency for the flow from upstream to enter either of the sleeves 17. Thus the sleeves are protected both against cross-flow and flow from upstream. The soil pipes and sleeves provide smooth flowing paths so that solids do not collect.

In the use of the device, the floor brackets 8 (or floor bracket) are first installed in a fixed position upon the floor 5; the fixture 9 is then mounted between the floor brackets or floor bracket and provided with the cover plate 10, with the gaskets 13 being installed between the flange 11 and the plates 10 where they are bolted.

The pipe 17 having been cut to the desired length, are fitted to the apertures 10' of the plates 10 and the gasket 14 fixed into the groove and the gland 15 then bolted into position, while compressing the gasket into firm contact with the outer surface of the sleeve 17.

A suitable tiling frame 37 is mounted within the openings 7, it being understood that the tiling frame is apertured to receive the sleeve 17. The toilet commode 20 is then engaged with the bolts 21 and with the sleeves 17 engaging the packing 18 upon the rear wall of the commode and with the clamping nuts 38 being tightened to dispose the rear wall of the commode in a position adjacent the wall 6 and by the use of the nuts 38, the outer ends of the sleeves 17 engage the gaskets 18 to firmly compress the gaskets into a sealing insulation with respect to the commode.

It will be apparent from the foregoing, that the flow from either of the back-to-back commodes will first strike the baffle 29, flowing down the curved wall of the pipe 28 for final discharge to the soil pipe 32. The apparatus thus described is simple to install, is most effective for mounting commodes upon opposite side walls and in back-to-back relation, where they both discharge into the chamber 25 and 25' and will be stopped by the baffle 29 and with the soil pipes 32 being of such length that a multiplicity of groups of commodes may be installed in back-to-back relation on opposite sides of the wall 6 and presents a continuous flow from one soil pipe to the fixtures 9 and then to the final discharge. The fixtures 9 and the plates 10 are all cast from metal and greatly facilitates the installation of the multiple commodes at a relatively low cost.

Figure 9:
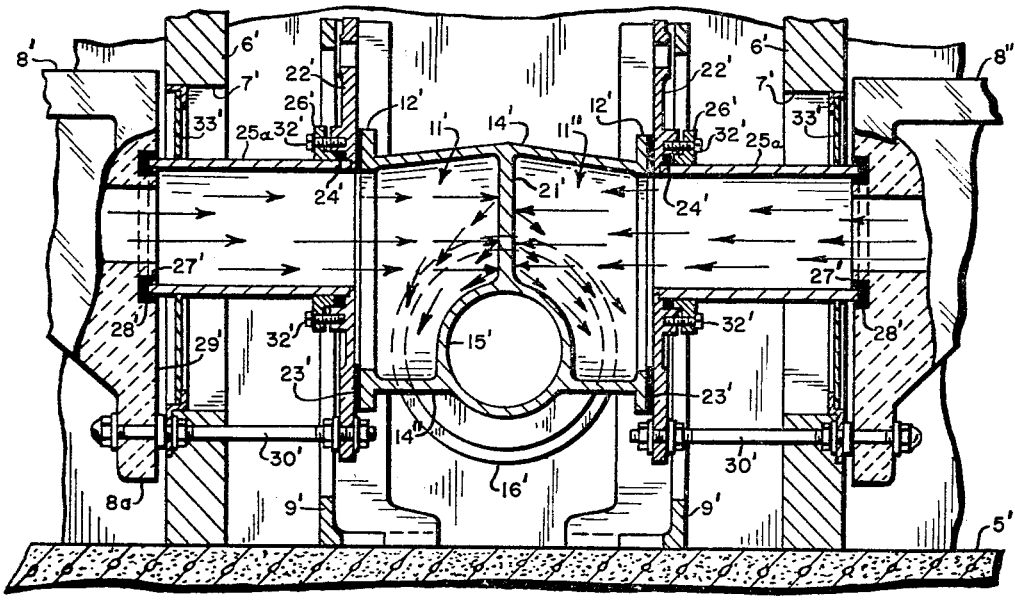
FIGURE 9 is a transverse section taken substantially on line 9—9 of FIGURE 8.
Figure 10:
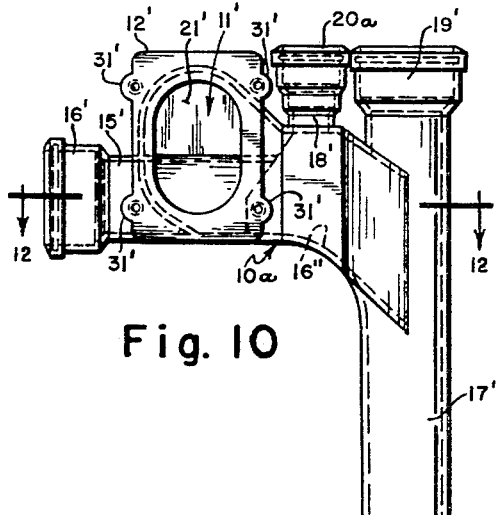
FIGURE 10 is a side elevational view of an end fixture.
Figure 11:
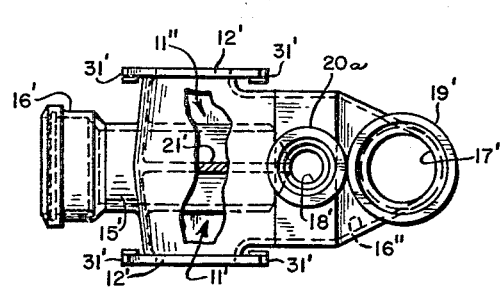
FIGURE 11 is a top plan view of the structure of FIGURE 10.
Figure 12:
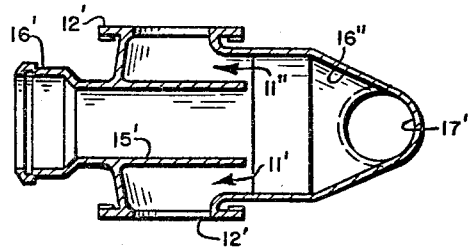
FIGURE 12 is a horizontal section taken substantially on line 12—12 of FIGURE 10.

Referring now to FIGURES 7 to 12, the numeral 5' designates a floor, such as a poured concrete slab, supporting spaced apart walls 6', of conventional construction. The walls 6' are provided with a relatively large aperture 7' for the passage of connecting means between water closets 8' and 8" and supported intermediate the spacing of the walls 6', upon floor brackets 9' are fittings 10a formed of cast material and with the fittings 10a provided with a relatively large chamber 11' and 11", that is provided at its opposite ends with flanges 12', that are apertured to receive bolts 13', whereby the fitting 10a is securely anchored to the floor brackets 9', it being understood that the brackets 9' are initially fixed to the floor 5' in suitably spaced apart position. Fixed between the flange or flanges 12' the closure plates 22' are gaskets 13, forming a seal between the cover plates and the flanges of the fitting. The chamber 11' and 11" is formed by upper and lower walls 14' and 14" and the wall 14" carries a cylindrical pipe section 15', that extends forwardly of the fixture where it is provided with a hub 16', constituting the connecting means between different fixtures. The pipe 15' is open at one end to communicate with a sump 16" that is formed integral with a vertically arranged soil pipe 17'. Communicating with the sump 16" is a vent pipe 18' and the soil pipe 17' and the vent 18' at their upper ends are provided with hubs 19' and 20a. Cast integral with the pipe 15' and the upper wall 14', is a baffle plate 21'.

Disposed between the flanges 12', at opposite sides of the fixture 10a are closure plates 22'. The plates 22' are cylindrically grooved to receive a packing ring 24' that receives a sleeve 25a and a packing gland 26'. The sleeve 25a accordingly is sealed with respect to the plate 22' and at its opposite ends, the sleeve 25a bears against a gasket 27', that seats within a groove 28' upon the rear face 29', of the commode 8' and, when the toilet is flushed, the flow is through the sleeve 25a into the chamber 11', striking the baffle 21', causing the flow to be directed to the sump 16" and the soil pipe 17'. The plate 22' is supported upon the floor frames 9' by elongated bolts 30', extending through ears 31' of the plates and forwardly pass through the openings in the walls 6' and through apertures in the mounting flange 8a of the commode 8'. The gasket 24' is compressed against the sleeve 25a by screws 32'. A suitable tiling frame 33' bearing against the wall or the tilting frame and the bolts 30' then made tight, causing the outer end of the sleeve 25a to bear against the gaskets 27' where they expand into fluid tight connection with the commode. The cover plates 22' are vertically adjustable with respect to the fixture 10a and the plates 22' are provided with oppositely extending ears that are apertured to receive bolts that fix the plates 22' at varying elevations with respect to the fixture 10a and whereby to adjust the level of the sleeves 25a so as to maintain the commodes at a constant position with respect to the floor area outside of the wall 5' and to permit the varying of the fixture or fitting 10a at varying levels for providing the flow-through from one fixture to another and from the last outward commode to the commode nearest the stack while maintaining each commode in uniform level the same distance above the floor. Where a number of commodes are to be installed in side-to-side relation and into a common soil pipe 34', the soil pipe 34' and with each of the fixtures being mounted at an elevation above the floor with the commodes in back-to-back relation, the commodes are now ready for use. The commodes may be either a siphon-jet or a blow-out closet. The flow will strike the baffle 21', causing the material to fall downwardly through the chamber 11' and 11" and be conveyed to the soil pipe 17', through the sump 16" then none of the material will be able to flow across the chamber 11' and 11", to enter the opposite sleeve 25a. The flow from upstream is carried by pipe section 15' well past the sleeve 25a so that there is no tendency for this flow to enter either of the sleeves 25a. The particular fixture greatly facilitates the installation of multiple back-to-back closets and the entire fixture 10a, including the vent and the soil pipe 17' are all cast as a unitary structure and the mounting of the commode with respect to the pipes 25a is relatively simple and establishes a leakproof arrangement of parts and it is pointed out, that the spacing of the commodes is determined by the spacing of the soil pipe 34' and permits numerous water closets to be mounted upon opposed wall surfaces. Each of the fixtures 10a are substantially identical, with the exception of the end fitting having the soil pipe 17', whereby the multiple units may be established on various floor levels.

It is to be understood that the invention is not limited to the precise construction shown, but that changes are contemplated as readily fall within the spirit of the invention as shall be determined by the scope of the subjoined claims.

I claim:

1. A fixture assembly for mounting water closets in a back-to-back relation with an area between walls to absorb the flow from each water closet whether the water closets be of the siphon-jet type or the blow-out type, said fixture assembly being mounted between a pair of water closets in back-to-back relation with one such closet at the outer surface of each wall, said fixture assembly including in combination a barrel having openings in opposite sides thereof and mounted with one of said openings opposite each of said water closets, said barrel providing a flow path longitudinally thereof to receive water from said water closets and also to receive water from upstream of said water closets, flow sleeves communicating respectively with said openings and also with said water closets for delivering water from said water closets to said barrel, a first soil pipe leading from upstream of said barrel into said barrel and past said sleeves and said openings to a point downstream therefrom for carrying water from upstream of said sleeves past said sleeves to prevent entry of such water into said sleeves, a second soil pipe communicating with said barrel downstream from said openings and said sleeves for carrying off water from said barrel, and a baffle extending between said first soil pipe within said barrel and the wall of said barrel dividing the interior of said barrel into two chambers for respectively receiving the flow from said sleeves, said baffle extending longitudinally of said barrel to a point downstream from said sleeves and said openings for directing water flow from said sleeves downstream into said second soil pipe and preventing water flow from one sleeve to cross said barrel and enter the other sleeve.

2. The fixture assembly as claimed in claim 1 wherein said first soil pipe is integral with the bottom wall of said barrel, and said baffle extends from the top of said first soil pipe to the top wall of said barrel.

3. The fixture assembly as claimed in claim 1 in which said barrel, said first and second soil pipes and said baffle are all integral portions of a single metal fixture unit.

4. The fixture assembly of claim 1 in which said assembly further includes a closure plate bolted to said barrel at each of said openings and having an aperture therein receiving a respective one of said sleeves, a first gasket between each said closure plate and said barrel for sealing said openings, said closure plates being grooved around said apertures, a second gasket in each of said grooves and bearing against said sleeves, said water closets having grooves receiving said sleeves, and a third gasket in each of said latter grooves for sealing said sleeves to said water closets.

5. The fixture assembly as claimed in claim 4 in which said closure plates are vertically adjustable with respect to said barrel and said sleeves are vertically adjustable by the adjustment of said cover plates so that said barrel and soil pipes may be inclined to allow multiple installations of fixture assemblies in a flow system with all of the water closets in the system at substantially an identical level above the floor.

References Cited

UNITED STATES PATENTS

| | | | |
|---|---|---|---|
| Re. 15,595 | 5/1923 | Bennett | 4—252 |
| 1,093,626 | 4/1914 | Hulbert | 4—252 |
| 1,124,049 | 1/1915 | Mann | 4—252 |
| 1,471,154 | 10/1923 | Graham | 4—252 |
| 1,473,439 | 11/1923 | Marsh | 4—252 |
| 1,582,845 | 4/1926 | McArthur | 4—252 |
| 1,855,024 | 4/1932 | Kersten | 4—252 |
| 1,996,693 | 4/1935 | Wallace | 4—252 |
| 2,015,349 | 9/1935 | McArthur | 4—252 |
| 2,686,321 | 8/1954 | Schmid | 4—252 |
| 2,901,754 | 9/1959 | Manas | 4—252 |
| 2,932,037 | 4/1960 | Manas | 4—252 |
| 3,268,919 | 8/1966 | Pope | 4—252 |

LAVERNE D. GEIGER, *Primary Examiner.*

D. MASSENBERG, *Assistant Examiner.*